(12) United States Patent
Ratkus et al.

(10) Patent No.: US 6,928,911 B1
(45) Date of Patent: Aug. 16, 2005

(54) METHOD AND APPARATUS FOR CUTTING TIRE PLY STOCK

(75) Inventors: Jeffery Raymond Ratkus, Danville, VA (US); Robert Charles Caillet, Lawton, OK (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/743,666

(22) PCT Filed: Jul. 17, 1998

(86) PCT No.: PCT/US98/14908

§ 371 (c)(1),
(2), (4) Date: Jan. 10, 2001

(87) PCT Pub. No.: WO00/03866

PCT Pub. Date: Jan. 27, 2000

(51) Int. Cl.[7] .............................. B26D 3/00; B26D 7/10; B26D 5/08
(52) U.S. Cl. .............................. 83/56; 83/171; 83/578; 83/614; 83/951
(58) Field of Search .......................... 83/56, 578, 171, 83/16, 614, 951

(56) References Cited

U.S. PATENT DOCUMENTS

| | | | |
|---|---|---|---|
| 1,449,445 A * | 3/1923 | Hand | 219/221 |
| 1,838,011 A * | 12/1931 | St. Peter | 83/614 |
| 2,165,842 A * | 7/1939 | Eger | 83/578 |
| 2,665,757 A | 1/1954 | Stevens et al. | |
| 2,921,627 A * | 1/1960 | Constantakis | 157/13 |
| 3,365,992 A | 1/1968 | Dreher | |
| 3,429,490 A | 2/1969 | Cantarutti | |
| 3,555,137 A * | 1/1971 | Carmody | 264/148 |
| 3,555,950 A * | 1/1971 | Gijsbers et al. | 83/171 |
| 3,641,855 A | 2/1972 | Balle | |
| 3,732,767 A | 5/1973 | Habert | |
| 3,779,121 A * | 12/1973 | Lagain | 83/614 |
| 3,789,712 A | 2/1974 | Enders | |
| D244,576 S * | 6/1977 | Van Alstine | D8/107 |
| 4,108,029 A * | 8/1978 | Borzym | 83/300 |
| 4,131,996 A | 1/1979 | Janke | |
| 4,140,046 A * | 2/1979 | Marbach | 83/171 |
| 4,156,378 A | 5/1979 | Felten | |

(Continued)

FOREIGN PATENT DOCUMENTS

DE      1 282 914      * 11/1968

(Continued)

*Primary Examiner*—Allan N. Shoap
*Assistant Examiner*—Jason Prone
(74) *Attorney, Agent, or Firm*—Brouse McDowell; Roger D. Emerson; Heather M. Barnes

(57) ABSTRACT

Method and apparatus for severing tire ply stock (S) wherein the apparatus includes a knife assembly (14) utilizing a blade (50) having a curved leading edge (58) and a straight trailing edge (62) which meet at a leading point (66). The ply stock (S) is supported by a slotted anvil (26) in the area immediately adjacent a cut line. In operation, the knife assembly (14) is lowered and the leading point (66) pierces the ply stock (S) between adjacent cords. During the downward stroke, the trailing edge (62) back-cuts the ply stock (S) from the insertion point (98) to a first lateral edge (18). The leading edge (58) severs the remainder of the ply stocks (S) as the knife assembly (14) traverses the ply stock to a second lateral edge (22).

8 Claims, 5 Drawing Sheets

U.S. PATENT DOCUMENTS

| | | | |
|---|---|---|---|
| 4,215,607 A | * 8/1980 | Hudson et al. | 156/575 |
| 4,306,607 A | * 12/1981 | Curry | 157/13 |
| 4,338,839 A | * 7/1982 | Farrell et al. | 83/620 |
| 4,338,840 A | * 7/1982 | Farrell et al. | 83/622 |
| 4,539,467 A | * 9/1985 | Wenger | 83/171 |
| 4,545,275 A | 10/1985 | Pearl | |
| 4,572,046 A | * 2/1986 | Still et al. | 83/171 |
| 4,608,890 A | 9/1986 | Still | |
| 4,656,910 A | * 4/1987 | Peterson | 83/56 |
| 5,036,740 A | * 8/1991 | Tsai | 83/455 |
| 5,101,094 A | * 3/1992 | Keller et al. | 139/291 C |
| 5,349,890 A | * 9/1994 | Butkus et al. | 83/171 |
| 5,613,414 A | * 3/1997 | Murphy et al. | 83/16 |
| 6,098,511 A | * 8/2000 | Rothemeyer et al. | 83/16 |

FOREIGN PATENT DOCUMENTS

| | | |
|---|---|---|
| EP | 0125148 | 11/1984 |
| JP | EP0768045 A1 | 4/1997 |

* cited by examiner

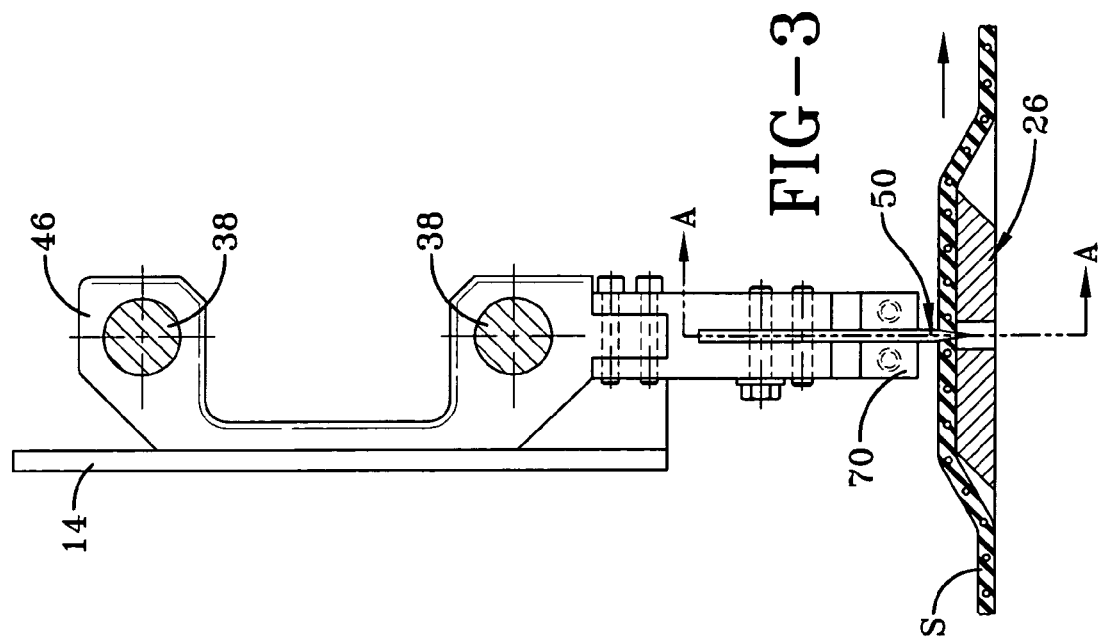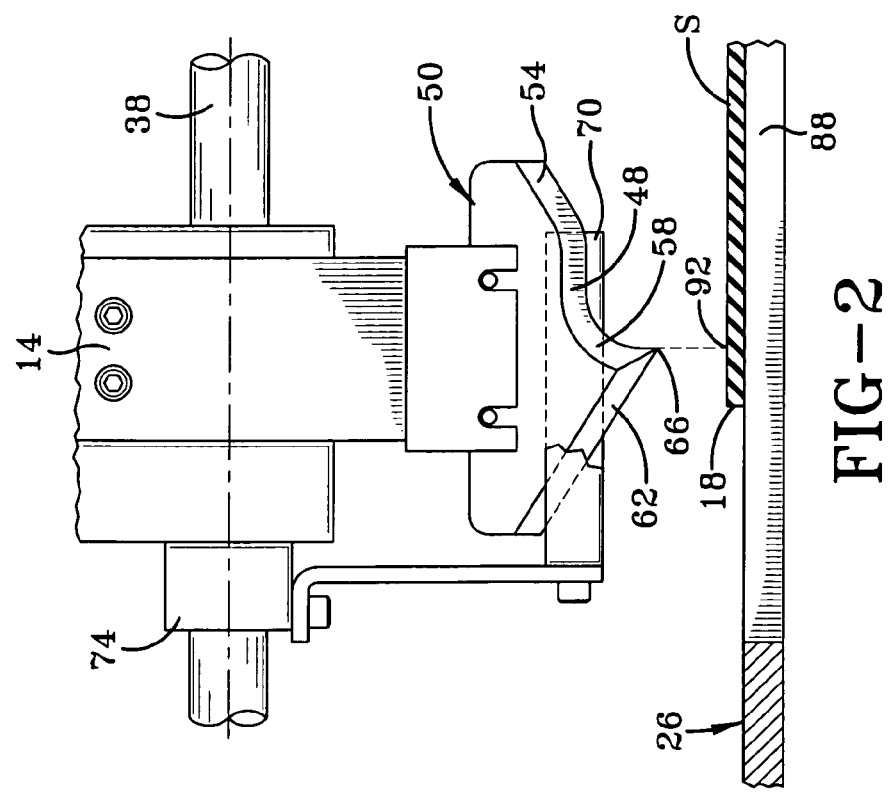

METHOD AND APPARATUS FOR CUTTING TIRE PLY STOCK

TECHNICAL FIELD

This invention pertains to methods and apparatus for cutting tire ply stock and the like.

BACKGROUND ART

Different apparatus and methods have been utilized in order to provide cut-to-length sections of ply stock used for building tires. In U.S. Pat. Nos. 3,429,490 and 3,641,855, apparatuses which utilize plunging knives are disclosed. In these apparatuses, a pair of knives is used to transpierce the ply stock at the center of the ply. Then each knife is moved to an opposite lateral edge of the ply stock. The cuts are made from the center outward in order to avoid crushing the lateral edges of the ply stock. A disadvantage of these apparatuses is that the two knives must cut between the same pair of adjacent cords.

In U.S. Pat. No. 3,789,712 a single knife blade is used. The blade is moved into a first edge of the ply which is lifted from the conveyor up against a stock support and held there by the oblique cutting edge while the knife blade makes its cutting stroke. This is an attempt to cut the ply without plunging the knife or using two cutters. A disadvantage of this type of cutter is that the lateral edge of the ply stock is subjected to an inwardly directed cut and damage to the edge may occur.

U.S. Pat. No. 4,156,378 discloses an apparatus which uses a circular rotatable disc cutter to engage a hard surface of an anvil and then roll on the surface to part the ply stock between a pair of cords. Again, the lateral edge is subjected to an inwardly directed cut.

The present invention provides a method and apparatus for severing ply stock between adjacent cords without the use of two separate knife blades in a way that does not damage lateral edges of the ply stock.

DISCLOSURE OF INVENTION

In accordance with the practice of the present invention, there is provided a new and improved method and apparatus for severing a belt package and the like to a predetermined length at a desired bias angle which employs a heated knife blade to facilitate clean cutting of the belt package between adjacent cords.

According to one aspect of the invention there is provided a method for cutting an associated the ply stock along a cut line using a cutting apparatus comprising a knife assembly, means for moving the knife assembly normally toward and away from the ply stock, and means for the traversing the knife assembly between a first lateral edge and a second lateral edge of the ply stock, the knife assembly including a blade having a cutting portion including a leading point, a leading edge and a the trailing edge, the trailing edge having an associated length, the ply stock having spaced first and second lateral edges, the method comprising the steps of:
  a. moving the knife assembly toward the ply stock to insert the leading point of the knife blade into the ply stock at an insertion point spaced a distance from the first lateral edge wherein the distance is less than or equal to length in order to back-cut the ply stock from the insertion point to the first lateral edge with the trailing edge of the blade; and,
  b. traversing the knife assembly across the ply stock toward the second lateral edge in order to cut the ply stock from the insertion point to the second lateral edge with the leading edge of blade and provide severance of the ply stock from the first lateral edge to the second lateral edge.

In accordance with another aspect of the invention there is provided a knife assembly for use in a cutting apparatus for cutting an associated ply stock along a cut line of an anvil, the knife assembly including a blade having a cutting portion including a leading point, a leading edge and a trailing edge, the knife assembly comprising:
  a. a leading edge of the blade including a concave portion adjacent the leading point for urging the ply stock towards anvil; and,
  b. the trailing edge of the blade having a generally linear profile.

According to a further aspect of the invention there is provided a cutting apparatus for cutting an associated ply stock along a cut line between first and second lateral edges, the apparatus comprising a knife assembly, means for the moving the knife assembly toward and away from the ply stock, and means for traversing the knife assembly between the first and second lateral edges of the ply stock, the knife assembly including a blade having a cutting portion including a leading point, a leading edge and a trailing edge, the trailing edge having an associated length, the cutting apparatus comprising the knife assembly having a home position wherein the leading point of the blade is directly above an insertion point of an associated ply stock and means for traversing the knife assembly between the first and second lateral edges of the ply stock, the knife assembly including a blade laving a cutting portion including a leading point, a leading edge and a trailing edge, the trailing edge having an associated length, the cutting apparatus comprising:
  the knife assembly having a home position wherein the leading point of the blade is directly above an insertion point of an associated ply stock and wherein a distance between the first lateral edge of the associated ply stock and the insertion point is less than or equal to the associated length of the trailing edge.

One advantage of the present invention is that the ply stock can be cut between adjacent cords without severing either cord.

Another advantage of the present invention is that the ply stock can be severed without damaging either lateral edge of the ply stock.

Still other benefits and advantages of the invention will become apparent to those skilled in the art upon a reading and understanding of the following specification.

BRIEF DESCRIPTION OF DRAWINGS

The invention may take physical form in certain parts and arrangement of parts, a preferred embodiment of which will be described in detail in this specification and illustrated in the accompanying drawings which form a part hereof and wherein:

FIG. 2 is an enlarged view of the knife blade shown in FIG. 1 prior to insertion of the knife blade.

FIG. 3 is a side view in section of the embodiment taken along the line 3—3 of FIG. 1

DETAILED DESCRIPTION OF THE INVENTION

Figure 1:
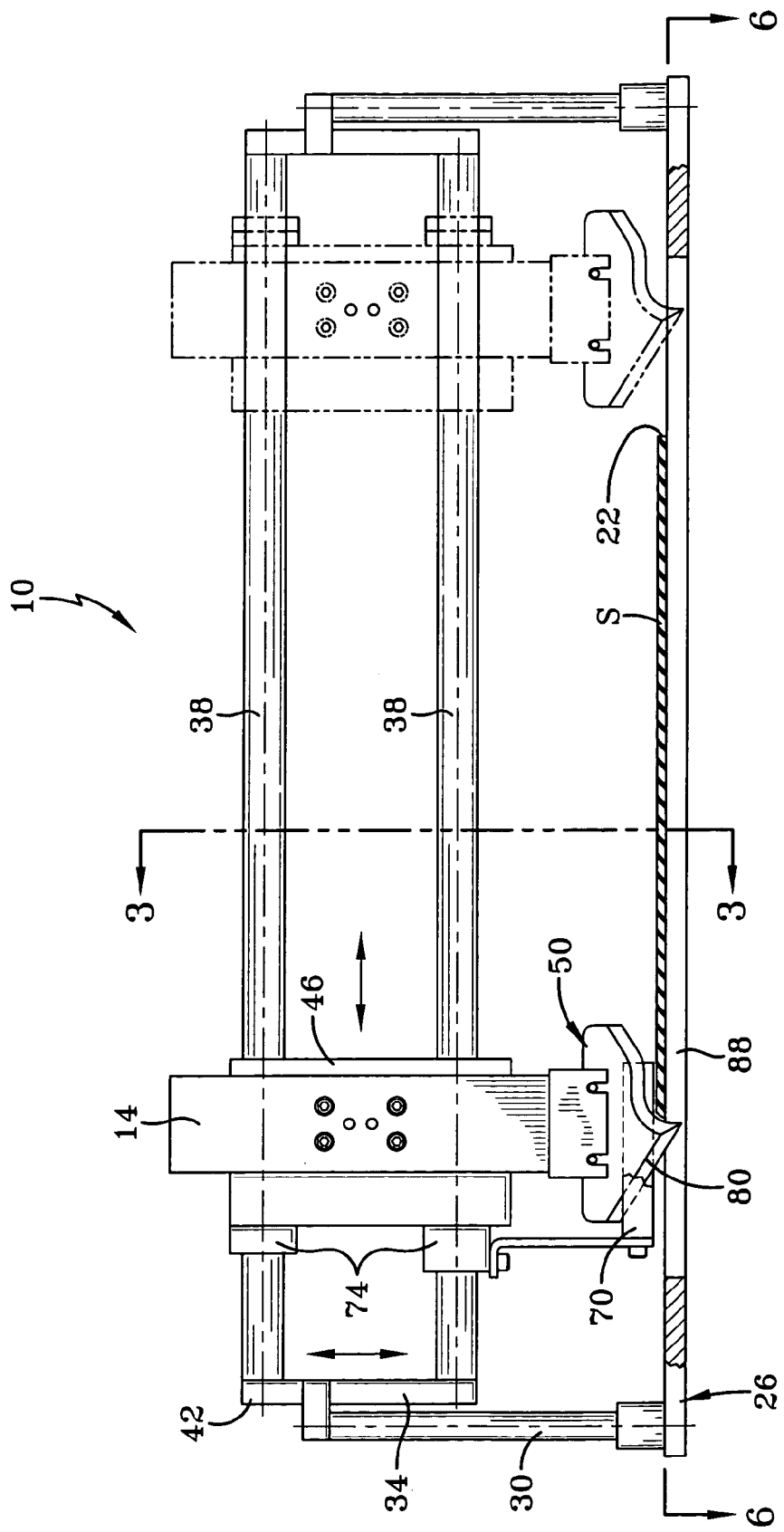
FIG. 1 is a front view of one embodiment of the present invention with the knife blade inserted into the ply stock and showing the knife assembly at the end of the cutting stroke in phantom lines.

Referring now to the drawings wherein the showings are for purposes of illustrating a preferred embodiment of the invention only and not for purposes of limiting the same, FIG. 1 shows an apparatus 10 for severing tire building sheet material, referred to herein as ply stock S. The apparatus 10 includes a knife assembly 14 which is mounted to means for moving the knife assembly toward and away from the ply stock to be cut. The apparatus 10 further includes means for moving the knife assembly 14 across the ply stock from a fist lateral edge 18 thereof to a second lateral edge 22. The apparatus 10 also includes an anvil 26 for supporting the ply stock S in the immediate area below a cut line A—A shown in FIGS. 3 and 8. The embodiment of apparatus 10 is shown in FIGS. 1 and 2, and 3 for illustrative purposes only and not by means of limiting the invention. In the preferred embodiment, the apparatus 10 includes a frame 30, an anvil 26, a carrier 34 including guide bars 38 extending between end support members 42, and a carriage 46. The carrier 34 is mounted on the frame 30 for movement toward and away from the anvil 26. The carriage 46 is mounted slidably along the bars 38 of the carrier 34 to traverse the knife assembly 14 between end members 42. A suitable mechanism (not shown), such as a pneumatic cylinder, may be provided for moving the carrier 34 toward and away from the anvil 26. Likewise, a suitable mechanism, such as a chain drive (not shown) may be provided for traversing the carriage 46 along guide bars 38. The ply stock S to be severed may be supported and moved in the direction shown by the arrow in FIG. 3 by any suitable conveyor (not shown). Preferably, the conveyor advances the ply stocks S by successive predetermined increments thereby providing uniform lengths of ply stock suitable for their intended application. The relative positioning of the members of apparatus 10 just before a cut is made is referred to herein as "home position" 48 and is illustrated in FIG. 2. At home position 48, the knife assembly 14 is positioned above the first lateral edge 18 of ply stock S.

Figure 4:
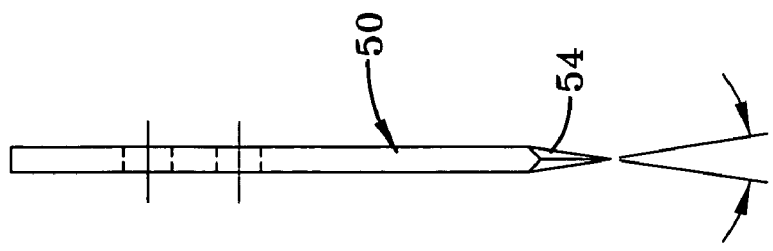
FIG. 4 is a side view of the knife blade shown in FIG. 2 taken along line 4—4.

With reference to FIG. 2, one embodiment of a knife assembly 14 according to the present invention is shown. The knife assembly 14 includes blade 50 having a cutting portion 54 including leading edge 58 and a trailing edge 62 which meet at leading point 66. Leading point 66 is used to penetrate the ply stock S upon downward movement of the knife assembly 14. In the preferred embodiment, the knife blade 50 is "hawk-billed" in shape with the leading edge 58 being curved in profile with a concave portion followed by a convex portion, as shown in FIG. 2, and the trailing edge 62 presenting a straight profile. As best shown in FIG. 4, the cutting portion 54 of the blade 50 is tapered to effectively cut ply stock S. Both the leading edge 58 and the trailing edge 62 are tapered in the preferred embodiment.

Figure 5:
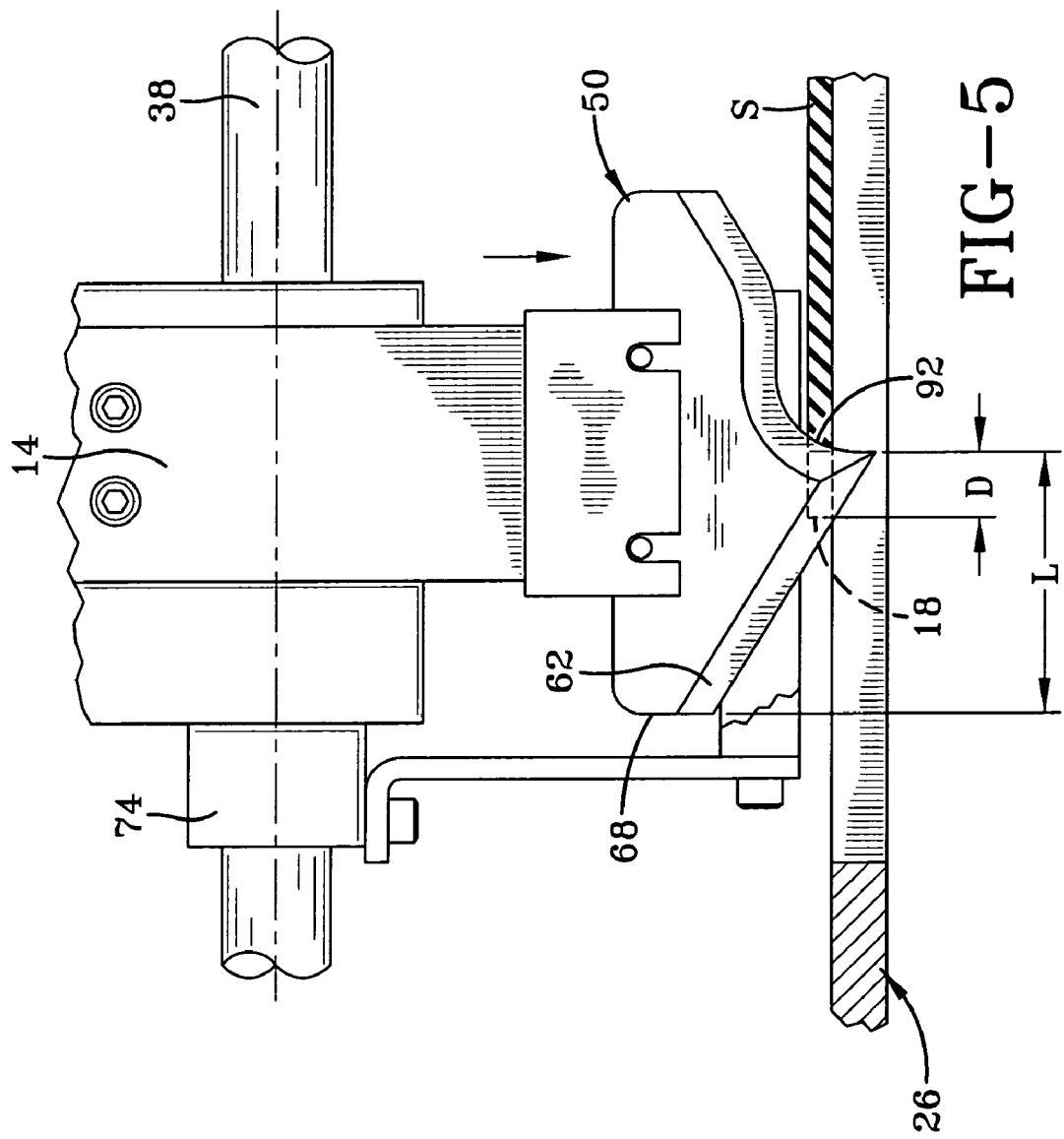
FIG. 5 is a partial view like FIG. 2 showing the knife blade after insertion through the ply stock.

As shown in FIG. 5, the trailing edge 62 of the knife blade 50 has a length, L, measured in a direction parallel to the direction of the blade traverse from leading point 66 to trailing end 68 that is equal to or greater than distance D from insertion point 92 to first lateral edge 18 of the ply stock S.

The preferred embodiment of the cutting apparatus 10 further includes means such as electric resistance heaters 70 for heating the knife blade 50 before each successive cutting operation. As shown in FIG. 1, in the preferred embodiment, the heaters 70 are secured to carrier 34 and do not traverse the ply stock S. The heaters 70 are positioned so that when the carriage 46 is positioned against left spacers 74 on the guide bars 38, the knife blade 50 is adjacent heaters 70 to enable the blade 50 to be heated before each successive cut. In the preferred embodiment, heater 70 is bifurcated to heat both sides of blade 50.

Figure 6:
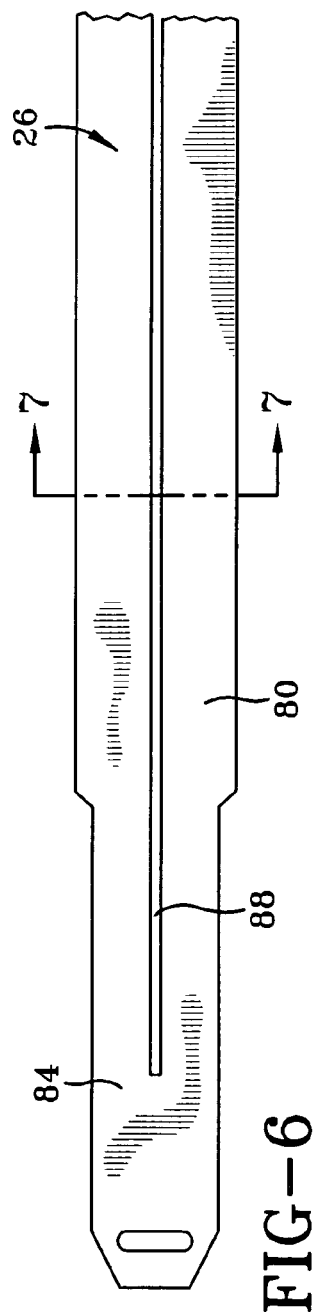
FIG. 6 is a top view of the slotted anvil shown in FIG. 1.
Figure 7:
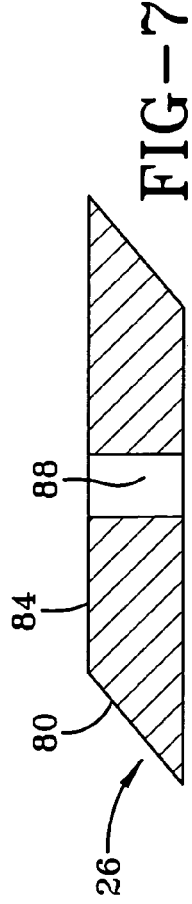
FIG. 7 is a cross-sectional view of the anvil taken along line 7—7 in FIG. 6.

One embodiment of an anvil 26 for use with the present invention is shown in FIG. 6 and FIG. 7. The anvil 26 includes a sloping side 80 and support surface 84 having a slot 88 therein. During a cutting operation, the slot 88 is generally aligned with the cut line indicated by A—A in FIG. 6.

Figure 8:
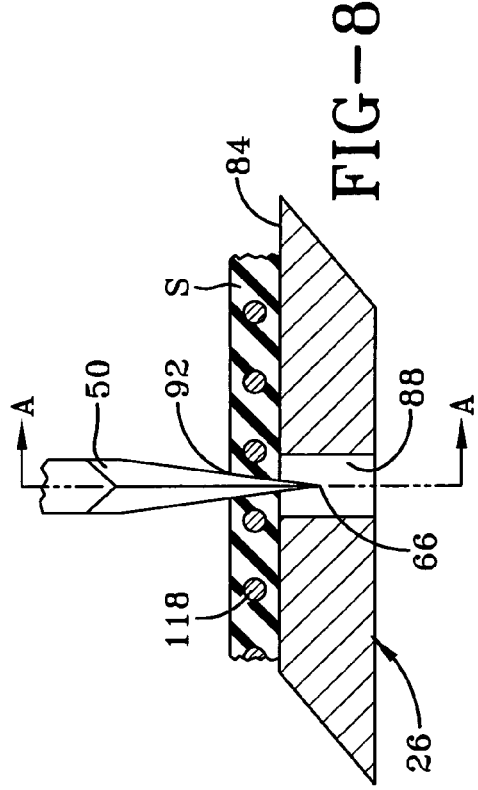
FIG. 8 is a cross-sectional view of two ply stock showing the knife blade inserted between a pair of embedded cords.

The preferred method for cutting the ply stock S is set forth below. The ply stock S may include embedded cords 118. As shown in FIG. 8, it is important that the ply stock S be cut between the adjacent cords 118 in a way that prevents exposing a bare cord or damaging either of the adjacent cords. It is also important that the lateral edges of the ply stock S be protected from damage which can occur when the lateral edge of the ply stock is crushed when the ply stock is cut from the outer edge inwardly. In operation, the ply stock S is positioned beneath the knife assembly 14. The ply stock S is supported in an area immediately adjacent the cut line by the support surface 84 of anvil 26. The slot 88 in the support surface 84 is aligned with the path the knife blade 50 will travel. The ply stock S is held in the cutting position by use of holding means such as a holding assembly (not shown). The knife blade 50 is pre-heated. The knife assembly 14 is then moved downwardly toward the ply stock S to bring the leading point 66 of the knife blade 50 into contact with the ply stock S. The heated knife blade 50 softens the ply stock S so that the leading point 66 of the knife blade may be plunged through the ply stock S at an insertion point 92 and into the slot 88. The insertion point 92 is located near a first lateral edge 18 or the ply stock S. On the downward stroke, as the knife blade 50 enters the ply stock S, the trailing edge 62 of the blade back-cuts the ply stock from the insertion point 92 to the first edge 18. The knife assembly 14 is then moved across the remaining width of the ply stock, while the leading edge 66 of the knife blade 50 severs the ply stock. The knife blade 50 cooperates with the slotted anvil 26 to perform the severing operation. Minor adjustments in the cord positioning during the cutting process is done by the action of the blade 50 within the slot 88 in order to prevent split cords. After the second lateral edge 22 is traversed, the knife assembly 14 is lifted away from the ply stock S. The cut length is then moved away from the anvil 26 in preparation for a successive cutting operation. The knife assembly 14 is returned to a "home" position 48 as shown in FIG. 2 where the blade 50 is heated again before beginning the next cut.

Figure 9:
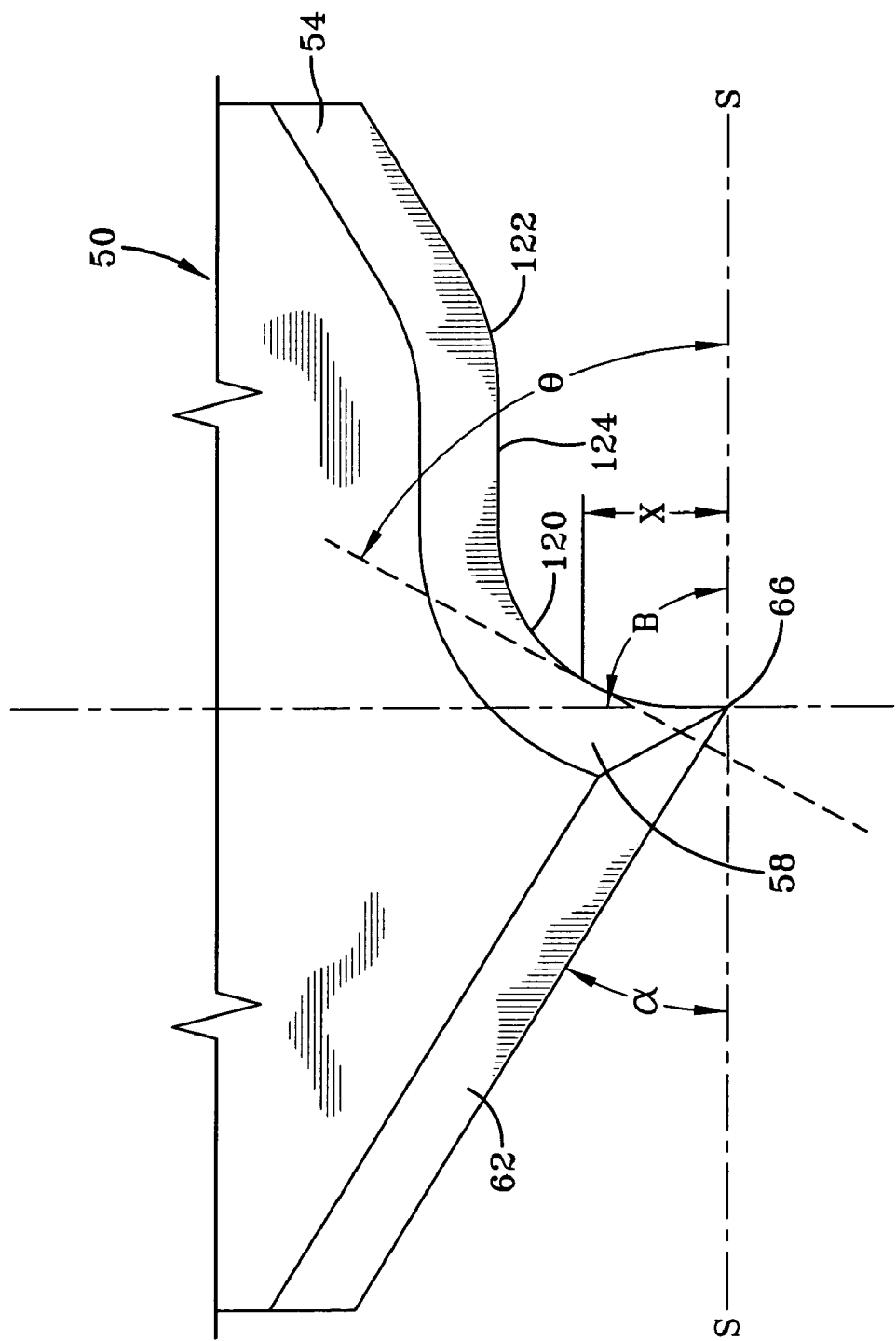
FIG. 9 is an enlarged view of the knife blade showing the configuration of the cutting edges of the blade.

The preferred embodiment of the blade 50 is shown in FIG. 9. There are several aspects of the preferred blade design which provide advantages over blades known in the art. For example, as the knife blade 50 is plunged into the ply stock S, the leading point 66 prevents movement of the blade 50 away from the lateral edge. The trailing edge 62 of the blade makes an angle α with the plane S—S of the ply stock S in order to back cut the ply stock from the insertion point to the first lateral edge. In the preferred embodiment, α is 30 degrees but may be in the range from 20 degrees to 40 degrees. The knife blade 50 is further characterized by the leading edge 58 having both a concave portion 120 and a convex portion 122 that meet at inflection point 124. The leading edge 58 makes an angle β with the plane S—S at the point of insertion which is preferably 90 degrees but may be from 70° to 90°. The, leading edge 58 makes an angle θ with the plane S—S at a position X spaced form the plane of the ply stock S—S as shown in FIG. 9 a distance greater than the thickness of the ply stock so that as the knife assembly traverses the remaining width of the ply stock S, the curvature of the leading edge 58 acts to cut the ply stock S and urge the ply stock S toward the anvil 26. Preferably the angle θ is 60 degrees but may be in the range of 40 degrees to 70 degrees.

The preferred embodiments of the invention have been described, hereinabove. It will be apparent to those skilled in the art that the above method and apparatus may incorporate changes and modifications without departing from the general scope of this invention. It is intended to include all such modifications and alterations in so far as they come within the scope of the appended claims or the equivalents thereof.

Having thus described the invention, it is now claimed:

1. A method for cutting an associated ply stock (S) along a cut line using a cutting apparatus comprising a knife assembly, means for moving said knife assembly normally toward and away from said ply stock (S), and means for traversing said knife assembly between a first lateral edge and a second lateral edge of said ply stock, said knife assembly including a blade having a cutting portion including a leading point, a leading edge and a trailing edge, said trailing edge having an associated length (L), said leading edge having a curved profile with a concave portion followed by a convex portion, and said trailing edge having a straight profile, said ply stock (S) having spaced first and second lateral edges, the method comprising the steps of:
   a. moving said knife assembly toward said ply stock (S) to insert the leading point of said knife blade into said ply stock (S) at an insertion point spaced a distance (D) from said first lateral edge wherein distance (D) is less than or equal to length (L) in order to back-cut said ply stock (S) from said insertion point to said first lateral edge with said trailing edge of said blade; and,
   b. traversing said knife assembly across said ply stock (S) toward said second lateral edge in order to cut said ply stock (S) from said insertion point to said second lateral edge with said leading edge of said blade and provide severance of said ply stock (S) from said first lateral edge to said second lateral edge, wherein said leading point of said knife blade is inserted into said ply stock a single time to produce said transverse cut.

2. The method of claim 1 wherein the cutting apparatus further includes an anvil having a slot in a support surface, said slot being generally aligned with the cut line, the method further comprising the steps of:
   a. inserting said leading point of said knife blade into said slot in said anvil after inserting said leading point into said ply stock (S); and,
   b. maintaining said leading point within said slot while said knife assembly traverses said ply stock (S).

3. The method of claim 1 wherein said leading edge of said knife blade includes a concave cutting portion, the method further comprising:
   engaging said concave cutting portion of said leading edge with said ply stock (S) after inserting said leading point into said ply stock (S).

4. The method of claim 1 wherein said cutting apparatus further includes means for heating said knife blade, the method further comprising the step of:
   heating said knife blade before inserting said leading edge into said ply stock (S).

5. The method of claim 4 further comprising by the step of:
   maintaining said heating means near said first lateral edge of said ply stock (S) during the traversing of said knife assembly.

6. A cutting apparatus for cutting an associated ply stock (S) having a width along a cut line between first and second lateral edges, said apparatus comprising a knife assembly, means for moving said knife assembly toward and away from said ply stock (S), and means for traversing said knife assembly between said first and second lateral edges of said ply stock (S), said knife assembly including a blade having a cutting portion including a leading point, a leading edge and a trailing edge, said trailing edge having an associated length (L), said leading edge having a curved profile with a concave portion followed by a convex portion, and said trailing edge having a straight profile, said cutting apparatus comprising:
   said knife assembly having a home position wherein said leading point of said blade is directly above an insertion point of said associated ply stock (S) and wherein a distance (D) between said first lateral edge of said associated ply stock (S) and said insertion point is less than or equal to said associated length (L) of said trailing edge, wherein said leading point of said knife blade is inserted into said ply stock a single time to produce a transverse cut.

7. The cutting apparatus of claim 6 further comprising:
an anvil positioned below said knife assembly and having a slot in a support surface, said slot being generally aligned with said cut line.

8. The cutting apparatus of claim 6 further comprising:
means for heating said knife blade.

* * * * *